United States Patent
Wilson et al.

[11] Patent Number: 6,116,304
[45] Date of Patent: Sep. 12, 2000

[54] POWER TOOL GUIDE ASSEMBLY

[76] Inventors: Tom J. Wilson, 125 Hurst Road, Sidcup, Kent DA15-9AQ; Martin Proctor, 8 Crescent Road, Erith, Kent DA8 2AU, both of United Kingdom

[21] Appl. No.: 09/244,398

[22] Filed: Feb. 4, 1999

[51] Int. Cl.[7] .................................................... B27C 1/00
[52] U.S. Cl. ................................ 144/154.5; 144/144.52; 144/253.5; 144/371; 83/471.2; 83/471.3; 83/486.1; 83/574
[58] Field of Search ........................... 144/134.95, 154.5, 144/253.1, 253.2, 253.5, 371, 144.52; 83/471.2, 471.3, 486.1, 574

[56] References Cited

U.S. PATENT DOCUMENTS

| 2,941,554 | 6/1960 | Long | 83/486.1 |
|---|---|---|---|
| 3,741,063 | 6/1973 | Bretthauer | 83/471.3 |
| 4,007,657 | 2/1977 | Burch | 83/471.3 |
| 4,133,237 | 1/1979 | Lewin | 83/471.3 |
| 4,155,383 | 5/1979 | Welliver | 144/154.5 |
| 4,237,762 | 12/1980 | Winter | 83/486.1 |
| 4,489,634 | 12/1984 | Volk | 83/471.2 |

*Primary Examiner*—W. Donald Bray

[57] ABSTRACT

A power tool guide system is provided including a base plate and at least one stanchion assembly mounted on the base plate. Also included is a guide assembly mounted on the stanchion assembly and defining a guide for slidably receiving a power tool thereon above base plate.

3 Claims, 3 Drawing Sheets

POWER TOOL GUIDE ASSEMBLY

BACKGROUND OF THE INVENTION

1. Field of the Invention

The present invention relates to woodworking machines and more particularly pertains to a new power tool guide assembly for employing a circular saw or router to cut various angles and miters without the need for a chop saw.

2. Description of the Prior Art

The use of woodworking machines is known in the prior art. More specifically, woodworking machines heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,111,409; U.S. Pat. No. 4,128,118; U.S. Pat. Des. 245,668; U.S. Pat. No. 1,669,716; U.S. Pat. No. 4,131,048; and U.S. Pat. No. 4,683,925.

In these respects, the power tool guide assembly according to the present invention substantially departs from the conventional concepts and designs of the prior art, and in so doing provides an apparatus primarily developed for the purpose of employing a circular saw or router to cut various angles and miters without the need for a chop saw.

SUMMARY OF THE INVENTION

In view of the foregoing disadvantages inherent in the known types of woodworking machines now present in the prior art, the present invention provides a new power tool guide assembly construction wherein the same can be utilized for employing a circular saw or router to cut various angles and miters without the need for a chop saw.

The general purpose of the present invention, which will be described subsequently in greater detail, is to provide a new power tool guide assembly apparatus and method which has many of the advantages of the woodworking machines mentioned heretofore and many novel features that result in a new power tool guide assembly which is not anticipated, rendered obvious, suggested, or even implied by any of the prior art woodworking machines, either alone or in any combination thereof.

To attain this, the present invention generally comprises a base plate constructed from wood and having a substantially planar rectangular configuration. The base is equipped with a top face, a bottom face, and a periphery formed therebetween defined by a pair of elongated side edges and a pair of short end edges. The base plate has a linear slit formed therein between a bisecting line of the base plate and one of the side edges thereof and in parallel relationship therewith. Ideally, ends of the slit terminate short of the end edges, as shown in FIG. 6. Next provided is a pair of stanchion assemblies each including a substantially planar rectangular bottom strip bolted to the top face of the base plate. The bottom strip of each stanchion assembly extends between the side edges and remains adjacent to one of the end edges in parallel relationship therewith. As shown in FIG. 3, each stanchion assembly has a pair of planar rectangular top strips each having a pair of short end edges and a pair of elongated side edges. One of the short edges of each top strip is mounted to the bottom strip adjacent to one of the ends thereof. As such, the top strips remain within a plane which is perpendicular to that in which the base plate resides. For reasons that will soon become apparent, a vertical slot is formed in each of the top strips. As best shown in FIGS. 1 & 6, a guide assembly is provided including a pair of short angle irons each including a substantially planar rectangular vertically oriented extent. Such vertically oriented extent has a pair of bolts coupled thereto and extending therefrom for being slidably received within the vertical slots of the top strips of the stanchion assemblies. In use, the vertically oriented extent may be fixed at a desired elevation via a pair of wing nuts. A substantially planar rectangular horizontally oriented extent is coupled along a bottom edge of the vertically oriented extent and extending therefrom in a direction opposite from that in which the bolts extend. A horizontal slot is formed in the horizontally oriented extent of the short angle iron. Such slot extends between a first end thereof and a midpoint thereof. The guide assembly further includes a pair of elongated angle irons, as shown in FIG. 2. The elongated angle irons each include a first elongated angle iron with a horizontally oriented extent having ends fixedly coupled to the horizontally oriented extents of the short angle irons adjacent to second ends thereof. As such, the horizontally oriented extent of the first elongated angle iron has a free edge in spaced parallel relationship with the slit of the base plate. See FIG. 6. Associated therewith is a second elongated angle iron with a horizontally oriented extent having ends each with a bolt coupled thereto and extending downwardly therefrom. These bolts are adapted for being slidably received within the horizontal slots of the short angle irons. In use, the second elongated angle iron may be fixed a selected distance from the first elongated angle iron via a pair of wing nuts. By this structure, the elongated angle irons define a guide for slidably receiving a power tool such as a router or a circular saw. Finally, a fence is provided including a substantially planar compass including an arcuate portion. The arcuate portion of the fence is equipped with a semicircular groove for slidably receiving a bolt mounted on the base plate. In use, the fence may be selectively fixed thereto via a wing nut. The fence is further equipped with a linear portion having a vertically oriented rectangular planar lip integrally coupled thereto and extending upwardly therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power tool guide assembly apparatus and method which has many of the advantages of the woodworking machines mentioned heretofore and many novel features that result in a new power tool guide assembly which is not anticipated, rendered obvious, suggested, or even implied by any of the prior art woodworking machines, either alone or in any combination thereof.

It is another object of the present invention to provide a new power tool guide assembly which may be easily and efficiently manufactured and marketed.

It is a further object of the present invention to provide a new power tool guide assembly which is of a durable and reliable construction.

An even further object of the present invention is to provide a new power tool guide assembly which is susceptible of a low cost of manufacture with regard to both materials and labor, and which accordingly is then susceptible of low prices of sale to the consuming public, thereby making such power tool guide assembly economically available to the buying public.

Still yet another object of the present invention is to provide a new power tool guide assembly which provides in the apparatuses and methods of the prior art some of the advantages thereof, while simultaneously overcoming some of the disadvantages normally associated therewith.

Still another object of the present invention is to provide a new power tool guide assembly for employing a circular saw or router to cut various angles and miters without the need for a chop saw.

Even still another object of the present invention is to provide a new power tool guide assembly that includes a base plate and at least one stanchion assembly mounted on the base plate.

Also included is a guide assembly mounted on the stanchion assembly and defining a guide for slidably receiving a power tool thereon above base plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
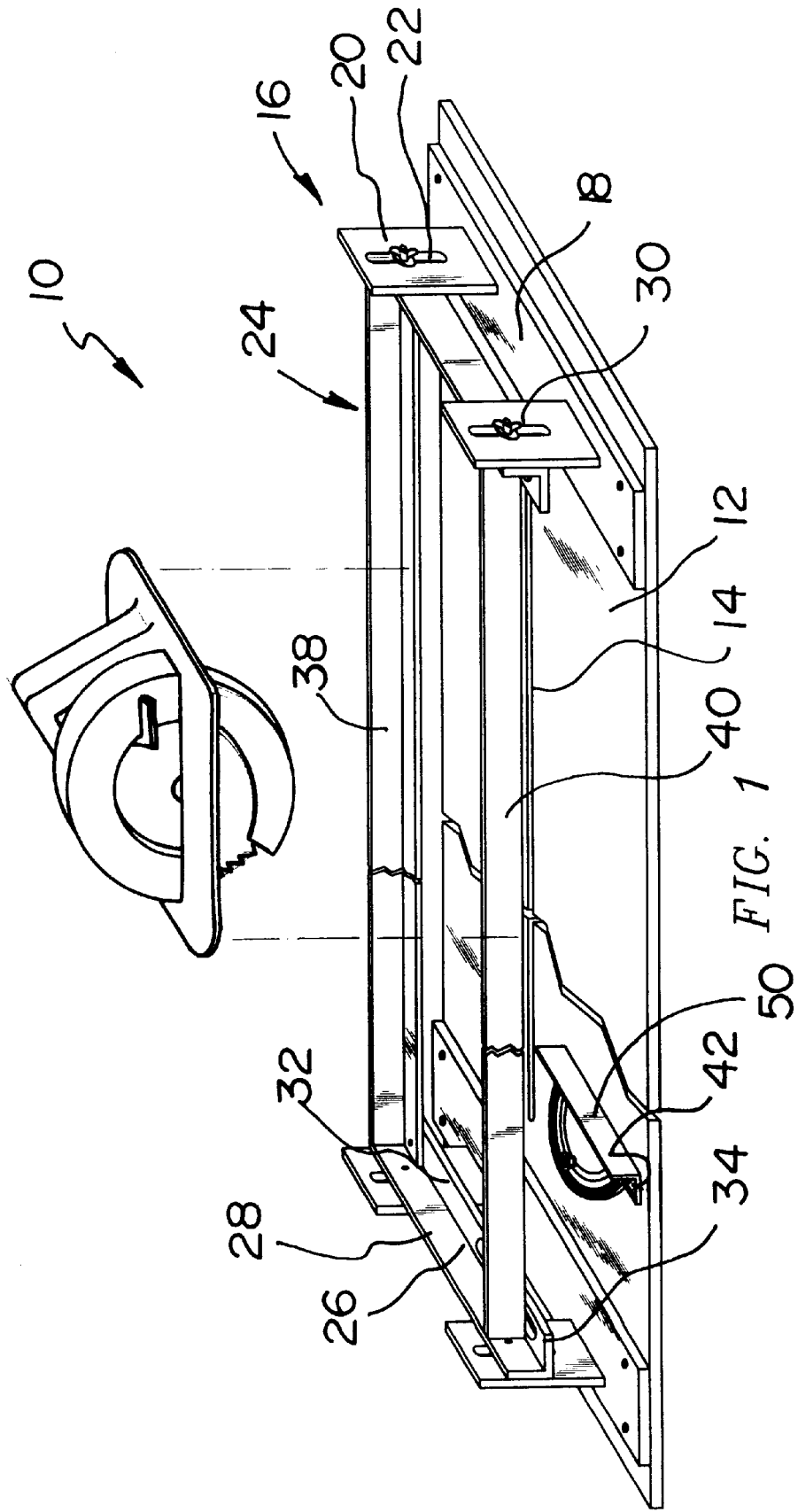
FIG. 1 is a perspective view of a new power tool guide assembly according to the present invention.

With reference now to the drawings, and in particular to FIGS. 1 through 6 thereof, a new power tool guide assembly embodying the principles and concepts of the present invention and generally designated by the reference numeral 10 will be described.

The present invention, designated as numeral 10, includes a base plate 12 constructed from wood and having a substantially planar rectangular configuration. The base is equipped with a top face, a bottom face, and a periphery formed therebetween defined by a pair of elongated side edges and a pair of short end edges. The base plate has a linear slit 14 formed therein between a bisecting line of the base plate and one of the side edges thereof and in parallel relationship therewith. Ideally, ends of the slit terminate short of the end edges, as shown in FIG. 6.

Figure 3:
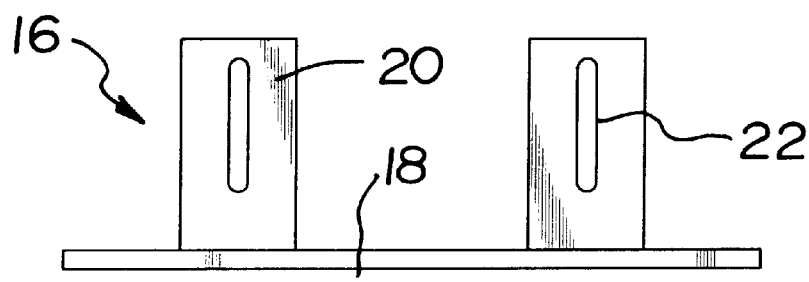
FIG. 3 is a side view of one of the stanchion assemblies of the present invention.
Figure 4:
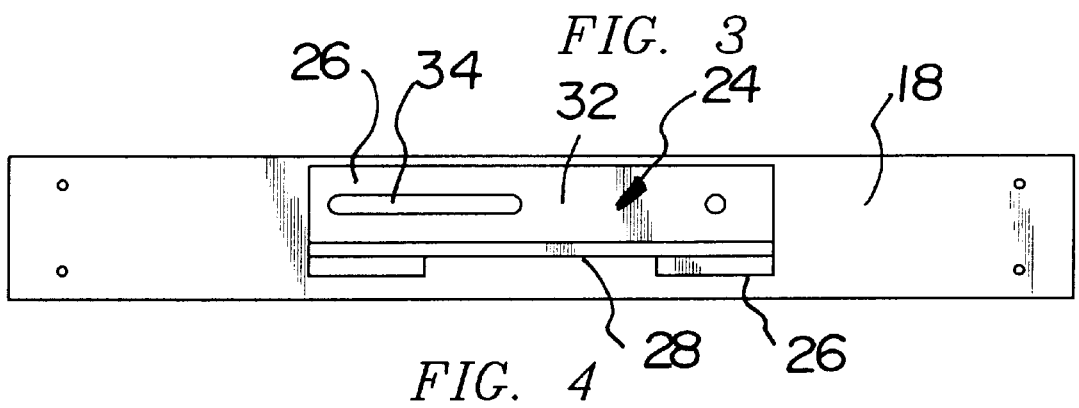
FIG. 4 is a top view of one of the stanchion assemblies of the present invention.
Figure 5:
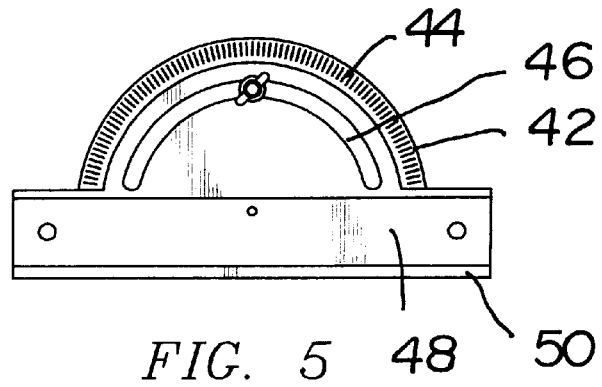
FIG. 5 is a top view of the fence of the present invention.

Next provided is a pair of stanchion assemblies 16 each including a substantially planar rectangular bottom strip 18 bolted to the top face of the base plate. The bottom strip of each stanchion assembly extends between the side edges and remains adjacent to one of the end edges in parallel relationship therewith. As shown in FIG. 3, each stanchion assembly has a pair of planar rectangular top strips 20 each having a pair of short end edges and a pair of elongated side edges. One of the short edges of each top strip is mounted to the bottom strip adjacent to one of the ends thereof. As such, the top strips remain within a common plane which is perpendicular to that in which the base plate resides. For reasons that will soon become apparent, a vertical slot 22 is formed in each of the top strips.

Figure 6:
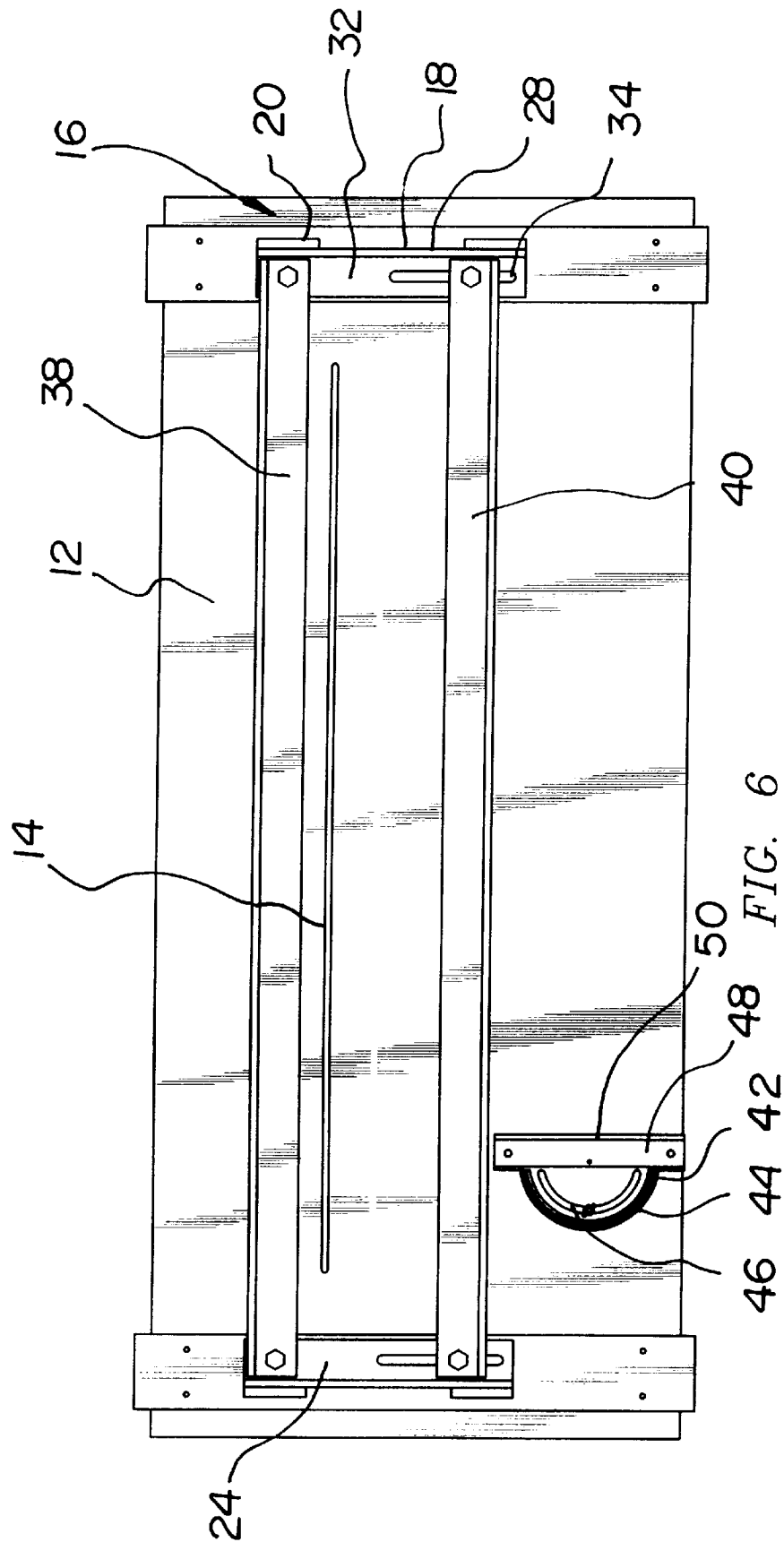
FIG. 6 is a top plan view of the present invention.

As best shown in FIGS. 1 & 6, a guide assembly 24 is provided including a pair of short angle irons 26 each including a substantially planar rectangular vertically oriented extent 28. Such vertically oriented extent has a pair of bolts 30 coupled thereto and extending therefrom for being slidably received within the vertical slots of the top strips of the stanchion assemblies. In use, the vertically oriented extent may be fixed at a desired elevation via a pair of wing nuts. A substantially planar rectangular horizontally oriented extent 32 is coupled along a bottom edge of the vertically oriented extent and extended therefrom in a direction opposite from that in which the bolts extend. A horizontal slot 34 is formed in the horizontally oriented extent of the short angle iron. Such slot extends between a first end thereof and a midpoint thereof.

Figure 2:
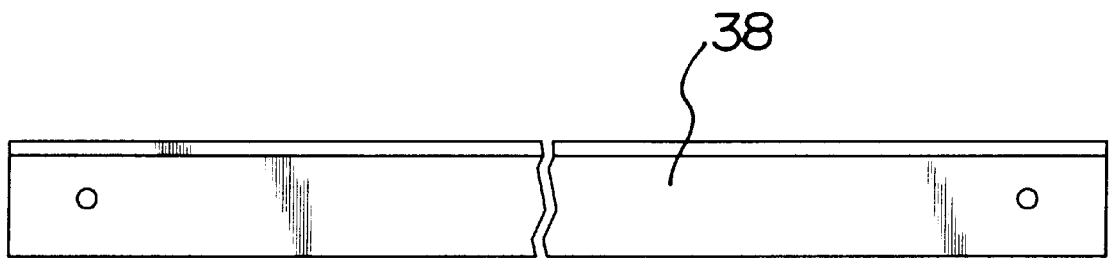
FIG. 2 is a top view of one of the elongated angle irons of the present invention.

The guide assembly further includes a pair of elongated angle irons 36, as shown in FIG. 2. The elongated angle irons each include a first elongated angle iron 38 with a horizontally oriented extent having ends fixedly coupled to the horizontally oriented extents of the short angle irons adjacent to second ends thereof. As such, the horizontally oriented extent of the first elongated angle iron has a free edge in spaced parallel relationship with the slit of the base plate. See FIG. 6. Associated therewith is a second elongated angle iron 40 with a horizontally oriented extent having ends each with a bolt coupled thereto and extending downwardly therefrom. These bolts are adapted for being slidably received within the horizontal slots of the short angle irons.

In use, the second elongated angle iron may be fixed a selected distance from the first elongated angle iron via a pair of wing nuts.

By this structure, the elongated angle irons define a guide for slidably receiving a power tool such as a router or a circular saw. The elongated angle irons may be selectively distanced to accommodate power tools of varying widths. Thereafter, a subject piece of wood may be positioned between the base plate and the elongated angle irons. Depending on the height of the piece of wood, a height of the elongated angle irons may be adjusted accordingly. A circular saw or router may thus be slid along the guide to cut various angles and miters in the piece of wood without the need for a chop saw.

Finally, a fence 42 is provided including a substantially planar compass including an arcuate portion 44. The arcuate portion of the fence is equipped with a semicircular groove 46 for slidably receiving a bolt mounted on the base plate. In use, the fence may be selectively fixed to the bolt and base plate via a wing nut. The fence is further equipped with a linear portion 48 having a vertically oriented rectangular planar lip 50 integrally coupled thereto and extending upwardly therefrom. In operation, the planar lip is adapted to be pivoted about a vertical axis about which the bolt is formed. The subject wood piece may thus be abutted against the fence and angled with respect to a direction of movement of the power tool.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A power tool guide system comprising, in combination:

a base plate constructed from wood and having a substantially planar rectangular configuration with a top face, a bottom face, and a periphery formed therebetween defined by a pair of elongated side edges and a pair of short end edges, the base plate having a linear slit formed therein between a bisecting line of the base plate and one of the side edges thereof and in parallel relationship therewith, wherein ends of the slit terminate short of the end edges;

a pair of stanchion assemblies each including a substantially planar rectangular bottom strip bolted to the top face of the base plate between the side edges and adjacent to one of the end edges in parallel relationship therewith, a pair of planar rectangular top strips each having a pair of short end edges and a pair of elongated side edges with one of the short edges of each top strip mounted to the bottom strip adjacent to one of the ends thereof such that the top strips remain within a plane which is perpendicular to that in which the base plate resides, and a vertical slot formed in each of the top strips;

a guide assembly including a pair of short angle irons each including a substantially planar rectangular vertically oriented extent having a pair of bolts coupled thereto and extending therefrom for being slidably received within the vertical slots of the top strips of the stanchion assemblies and further fixed at a desired elevation via a pair of wing nuts, a substantially planar rectangular horizontally oriented extent coupled along a bottom edge of the vertically oriented extent and extending therefrom in a direction opposite from that in which the bolts extend, and a horizontal slot formed in the horizontally oriented extent of the short angle iron and extending between a first end thereof and a midpoint thereof, the guide assembly further including a pair of elongated angle irons including a first elongated angle iron with a horizontally oriented extent having ends fixedly coupled to the horizontally oriented extents of the short angle irons adjacent to second ends thereof such that the horizontally oriented extent of the first elongated angle iron has a free edge in spaced parallel relationship with the slit of the base plate and a second elongated angle iron with a horizontally oriented extent having ends each with a bolt coupled thereto and extending downwardly therefrom for being slidably received within the horizontal slots of the short angle irons and further fixed a selected distance from the first elongated angle iron via a pair of wing nuts, wherein the elongated angle irons define a guide for slidably receiving a power tool; and a fence including a substantially planar protractor potion including an arcuate portion with a semicircular groove formed therein for slidably receiving a bolt mounted on the base plate adjacent one of the side edges of the base plate and being selectively fixed thereto via a wing nut and a linear portion with a vertically oriented rectangular planar lip integrally coupled thereto and extending upwardly therefrom.

2. A power tool guide system comprising:

a base plate having a top surface for resting a work piece thereon;

at least one stanchion assembly mounted on the base plate;

a guide assembly mounted on the stanchion assembly and defining a guide channel for slidably receiving a power tool thereon for controlling movement of the power tool above the base plate; and a fence movably mounted on the base plate, the fence including a substantially planar protractor portion including an arcuate portion with a semicircular groove formed therein for slidably receiving a fastener mounted on the base plate and being selectively fixed thereto and a linear portion with a vertically oriented lip integrally coupled thereto and extending upwardly therefrom;

wherein the guide assembly includes a pair of side guide members which are adapted to be selectively spaced with respect to each other, the side guide members restricting lateral movement of the power tool, the guide assembly including a pair of end guide members restricting the extent of longitudinal movement of the power tool, the guide members comprising angle members, each angle member having a substantially horizontally oriented extent for supporting the power tool thereon, each angle member having a substantially vertically oriented extent for guiding movement of the power tool above the base plate;

wherein a first one of the guide members is fixed with respect to the base plate and a second one of the guide members is movable with respect to the base plate; and wherein the guide assembly is adapted to be selectively elevated with respect to the base plate.

3. A power tool guide system comprising:

a base plate having a substantially planar top face, a bottom face, and a periphery formed therebetween defined by a pair of side edges and a pair of end edges, the base plate having a linear slit formed therein extending between the end edges and substantially parallel to the side edges;

a pair of stanchion assemblies each including a bottom strip mounted on the top face of the base plate, the bottom strip being positioned between the side edges and adjacent to one of the end edges in parallel relationship with the end edges, a pair of top strips each having a pair of short end edges and a pair of elongated side edges with one of the short edges of each top strip being mounted to the bottom strip adjacent to one of the end edges of the bottom strips such that the top strips lie substantially in a plane which is perpendicular to that in which the base plate resides, and a vertical slot formed in each of the top strips;

a guide assembly including a pair of short angle members, each short angle member including a substantially vertically oriented extent having a pair of fastener structures coupled thereto, each of the fastener structures extending from the vertically oriented extent for being slidably received in one of the vertical slots of the top strips of the stanchion assemblies, the vertically oriented extents being fixable at a desired elevation from the base plate by the fastener structures, a substantially horizontally oriented extent coupled along a bottom edge of the vertically oriented extent and extending from the vertically oriented extent, and a horizontal slot formed in the horizontally oriented extent of the short angle member, the guide assembly further including a pair of elongated angle members including a first elongated angle member, the first elongated angle member having a substantially horizontally oriented extent with ends fixedly coupled to the horizontally oriented extents of the short angle members such that the horizontally oriented extent of the first elongated angle member has a free edge in spaced substantially parallel relationship with the slit of the base plate, a second elongated angle member having a substantially horizontally oriented extent with ends, each end having a fastener structure mounted thereon and extending downwardly therefrom for being slidably received in the horizontal slots of the short angle members, the short angle members being fixable at a selected distance from the first elongated angle member, wherein the elongated angle members define a guide for slidably receiving a power tool resting on the horizontally oriented extents of the angle members; and a fence including a substantially planar protractor portion including an arcuate portion with a semicircular groove formed therein for slidably receiving a fastener mounted on the base plate adjacent one of the side edges of the base plate and being selectively fixable thereto, the fence including a linear portion with a vertically oriented lip integrally coupled thereto and extending upwardly therefrom.

* * * * *